(12) United States Patent
Kellner et al.

(10) Patent No.: US 11,879,453 B2
(45) Date of Patent: Jan. 23, 2024

(54) METHOD FOR OPERATING A PUMP, AND FLUID SUPPLY SYSTEM HAVING A PUMP OF SAID TYPE

(71) Applicant: Robert Bosch GmbH, Stuttgart (DE)

(72) Inventors: Andreas Kellner, Tamm (DE);
Annabel Hackert, Leonberg (DE);
Arno Matzner, Kornwestheim (DE);
Horst Kleinknecht, Fichtenberg (DE);
Jasper Grohmann, Stuttgart (DE);
Sebastian Gepperth, Stuttgart (DE);
Siegfried Zerbin, Hinterlintal (DE);
Vellaiyan Thiruvarma, Tamilnau (IN)

(73) Assignee: Robert Bosch GmbH, Stuttgart (DE)

( * ) Notice: Subject to any disclaimer, the term of this patent is extended or adjusted under 35 U.S.C. 154(b) by 156 days.

(21) Appl. No.: 17/465,201

(22) Filed: Sep. 2, 2021

(65) Prior Publication Data
US 2022/0065240 A1 Mar. 3, 2022

(30) Foreign Application Priority Data
Sep. 2, 2020 (DE) .......................... 102020211030.1

(51) Int. Cl.
*F04B 49/22* (2006.01)
*F01N 3/20* (2006.01)

(52) U.S. Cl.
CPC .............. *F04B 49/22* (2013.01); *F01N 3/208* (2013.01); *F01N 2610/02* (2013.01)

(58) Field of Classification Search
CPC ...... F04B 7/0076; F04B 49/03; F04B 49/065; F04B 49/22; F04B 15/00; F04B 2201/0207; F04B 2201/0601; F01N 3/2066; F01N 3/208; F01N 2610/02; F01N 2610/144; F01N 2900/1808; F01N 2900/1822
See application file for complete search history.

(56) References Cited

U.S. PATENT DOCUMENTS

| | | | |
|---|---|---|---|
| 8,027,751 B2* | 9/2011 | Dingle | ................... F01N 3/2066 700/282 |
| 9,010,104 B2* | 4/2015 | Rampen | .................. F04B 51/00 60/459 |
| 9,739,266 B2* | 8/2017 | Salter | ....................... F03B 15/02 |
| 9,797,252 B2* | 10/2017 | Stein | ....................... F01B 17/00 |

(Continued)

FOREIGN PATENT DOCUMENTS

| | | |
|---|---|---|
| DE | 20303746 U1 | 5/2003 |
| DE | 102016015110 A1 | 6/2018 |

(Continued)

*Primary Examiner* — Alexander B Comley
(74) *Attorney, Agent, or Firm* — Michael Best & Friedrich LLP (57) ABSTRACT

A method for operating a pump of a delivery unit, in particular of a fluid supply system, having a pump chamber and an actively controllable inlet valve and an actively controllable outlet valve for the pump chamber, wherein, for the delivery of a fluid, a pressure (p), which is to be provided by the pump, of the fluid for delivery is controlled in closed-loop fashion on the basis of a manipulated variable (V), and wherein, within one full cycle (Z) of the pump (200), at least one of inlet valve (211) and outlet valve (212) is activated only if fluid is to be delivered, and is not activated if no fluid is to be delivered, and to a fluid supply system.

6 Claims, 5 Drawing Sheets

(56) References Cited

U.S. PATENT DOCUMENTS

2010/0307599 A1* 12/2010 Morris ................ F04B 53/1082
251/65
2011/0268590 A1* 11/2011 Stein ....................... F04B 49/24
417/302
2019/0383282 A1* 12/2019 Peters ..................... F04B 15/00

FOREIGN PATENT DOCUMENTS

| DE | 112017002054 T5 | 12/2018 |
| DE | 102018208112 A1 | 11/2019 |
| DE | 102018212985 A1 | 2/2020 |
| DE | 102019212831 A1 | 3/2021 |

\* cited by examiner

METHOD FOR OPERATING A PUMP, AND FLUID SUPPLY SYSTEM HAVING A PUMP OF SAID TYPE

BACKGROUND OF THE INVENTION

The present invention relates to a method for operating a pump, to a processing unit and a computer program for carrying out said method, and to a fluid supply system having a pump of said type and a processing unit of said type.

In an after treatment of exhaust gases of motor vehicles, the so-called SCR (Selective Catalytic Reduction) method may be used in particular for the reduction of nitrogen oxides ($NO_x$). Here, a urea-water solution is introduced as reducing agent solution into the typically oxygen-rich exhaust gas.

For this purpose, use may be made of a dosing module or dosing valve which comprises a nozzle for spraying or introducing the urea-water solution into the exhaust-gas flow. Upstream of an SCR catalytic converter, the urea-water solution reacts to form ammonia, which subsequently binds with the nitrogen oxides on the SCR catalytic converter, resulting in the formation of water and nitrogen.

The dosing valve is typically connected via a pressure line to a delivery unit. A pump or delivery pump of the delivery unit pumps the urea-water solution from a reducing agent tank to the dosing valve or to a dosing module. Additionally, it is normally the case that a return line is connected to the reducing agent tank, via which return line excess urea-water solution can be returned. An aperture or restrictor in the return line can control the backflow.

SUMMARY OF THE INVENTION

According to the invention, a method for operating a pump, a processing unit, a fluid supply system and a computer program for carrying out said method, are proposed.

The invention is concerned with a method for operating a pump, having a pump chamber with an inlet valve and an outlet valve, which are actively controllable, that is to say can be opened and closed in targeted fashion. Although the invention is described in particular with regard to a fluid supply system in the case of which the pump is used in a delivery unit or as a delivery unit, the proposed method may also be used in the case of other pumps, as long as at least inlet valve and outlet valve are actively controllable.

An actively controllable valve (this applies both to the inlet valve and to the outlet valve) is to be understood here to mean that the opening and closing of the valve can be actively effected in targeted fashion, for example by means of a magnetic switch and/or as a valve switched by means of an electromagnet. Correspondingly, other valves—or valves that are conventionally used in pumps in SCR systems—are valves which open passively or automatically in the presence of a particular pressure. By means of such conventional valves, it is thus possible, for example in a suction phase of the pump, for fluid to be drawn in through the inlet valve into the pump chamber, and then, in a pumping or delivery phase, for said fluid to be forced through the outlet valve—with the inlet valve closed—out of the pump chamber.

In the proposed method, it is now the case that, for the delivery of a fluid such as a urea-water solution, that is to say when the fluid is to be delivered, a pressure, which is to be provided by the pump, of the fluid for delivery is controlled in closed-loop fashion on the basis of a manipulated variable (to a setpoint value).

One possibility in the case of such closed-loop control of the pressure is, in particular in view of the actively controllable valves, for an activation parameter of inlet valves or outlet valves, or a pump frequency of the pump, to be used as manipulated variable. It would also be possible for several of these manipulated variables to be used simultaneously.

Here, the activation parameters of inlet valve and outlet valve comprise for example an activation time (that is to say start of the activation or electrical energization) of the inlet valve, an opening time of the inlet valves, an activation duration (that is to say duration of the activation or electrical energization) of the inlet valve, an opening duration of the inlet valves, an activation time of the outlet valve, an opening time of the outlet valves, an activation duration of the outlet valve and an opening duration of the outlet valve. In this regard, note that the activation and opening time of a valve are generally offset with respect to one another to a certain extent, for example because it is first necessary for a certain current to be built up in a magnet before an associated valve opens. In this respect, it is generally the case that one of these two times is selected as activation parameter. This correspondingly also applies to an end of activation and a closing time, and the resulting activation duration and opening duration. It is likewise possible for the activation parameters of inlet valve and outlet valve to be specified as a function of an angle (that is to say between 0° and 360° in relation to a shaft of the pump or of the drive, or possibly also in relation to one full pass of a linear drive), that is to say, for example, an activation angle or angle ranges of the valves etc. may be used as activation parameters.

In the case of conventional piston pumps, the delivery element corresponds to the piston. For example, for a fluid supply system, it is also possible for a so-called diaphragm pump to be used, in the case of which the pump chamber is closed at one side by means of a flexible diaphragm as delivery element, which diaphragm can be moved back and forth by means of an electromagnetic linear actuator as drive, or by means of an electrical rotary drive with an eccentric, in order to decrease and increase the volume of the pump chamber.

The pump frequency, which can also be used as manipulated variable, then corresponds for example to a frequency with which such an electromagnetic linear actuator as drive (in the case of a diaphragm pump or a similar pump with linear actuator) is moved. In the case of a conventional piston pump or else diaphragm pump with rotary drive, the pump frequency may also correspond to the rotational speed (of a motor or electric motor by means of which the piston—after conversion of the rotational movement into a linear movement—is moved).

Through the use of these specific manipulated variables, which is in particular made possible in the first place through the use of the actively activatable valves, it is possible to attain various operating points of the pump that were hitherto not possible. For example, a working point without a volume flow (or with a zero volume flow) of the fluid can be achieved in the case of a certain delivery pressure (for example 9 bar between outlet and inlet), specifically without the use of additional hardware (such as for example a return line into the tank).

A further special feature is that the delivery device can be reversed through corresponding valve activation. For this purpose, the functions of inlet valve and outlet valves can be interchanged, which is possible owing to the active activation. If a liquid-filled system can be damaged as a result of freezing and resulting ice pressure, it may be expedient if the delivery direction can be reversed without additional hardware, such as directional valves, in order to evacuate the system after the end of an operating cycle.

Here, it is also possible either to set the pump frequency to a constant value, and to use one or more of the activation parameters of the valves as manipulated variable(s), or to set these activation parameters of the valves to a constant value, and to use the pump frequency as manipulated variable.

Despite these particular advantages of the actively controllable valves, for example the fundamentally efficient operation of the pump, this is however associated with a certain inefficiency in the case of small mass flows of the fluid for delivery. This is in particular also owing to the fact that all valves continue to be opened and closed during one cycle of the pump, in a replication of a pump with passive valves. However, by means of the actively controllable valves, the times and durations can be adapted.

A further aspect is that, owing to friction forces, the drive of the pump cannot be operated with an arbitrarily low frequency or rotational speed, that is to say the pump frequency can either be set to zero, by deactivation of the drive, or else to a certain minimum value of for example 500 rpm. At this minimum value, however, the mass flow of the fluid does not reach zero in the case of conventional activation of the valves.

In the context of the present invention, it is now proposed that, within one full cycle of the pump, that is to say one full stroke of the delivery element of the pump including raising and lowering, at least one of the valves, that is to say one of inlet valve and outlet valve, is activated proceeding from a certain position, until this position is reached again (for example one full revolution of the rotary drive), only when required, but not generally always. The valves, or at least one of said valves, can thus for example remain in a position in which they are presently situated, that is to say open or closed. It is thus in particular the case only when fluid is to be delivered that at least one of the actively controllable valves is actuated, and, if no fluid is to be delivered, at least one of the actively controllable valves is thus not activated. It is thus possible for unnecessary activation processes or actuations of the valves to be avoided, which increases both the energy efficiency and the service life of the valves and thus of the pump. The pump can always be operated with optimum charging, corresponding to so-called volumetric pump operation.

It is expedient that, when no fluid is to be delivered, a zero delivery state is implemented, or a zero delivery state is realized, by means of the pump. It is likewise also possible, for example, for the drive of the pump not to be actuated, whereby the service life of the drive is also increased. Furthermore, it is possible in particular for the inlet valve to remain permanently open, that is to say for example energized, during a period of time in which no fluid is to be delivered, in order to thus pump fluid back into the feed line in the delivery phase. The drive itself may however also remain active in order to realize the zero delivery state, for example even with the valves closed. Furthermore, it is likewise possible for both valves to be activated in order to realize the zero delivery state (for example such that a minimum volumetric efficiency is realized, even if this entails poor hydraulic efficiency).

One possibility for controlling the pressure in closed-loop fashion, and in so doing activating the valves only when required, is two-point closed-loop control. Here, a use of an activation of the inlet valve and of the outlet valve is used as manipulated variable, that is to say it is possible to switch between an on state, in which an activation of the valves is performed, and an off state, in which no activation of the valves is performed. Correspondingly to two-point closed-loop control, it is possible for this purpose to use two threshold values, an upper threshold value which is somewhat higher than a pressure setpoint value that is to be adjusted to, and a lower threshold value that is somewhat lower than a pressure setpoint value that is to be adjusted to. The specific spacings of the threshold values to the setpoint value can be suitably selected here. If the actual value of the pressure reaches the upper threshold value, the activation of the valves is stopped, and if the actual value reaches the lower threshold value, the activation is (re-)started. Here, the pump frequency is set to a predetermined, in particular minimum possible, value greater than zero.

This two-point closed-loop control is used at least in a part of an available mass flow range, wherein the available mass flow range is to be understood to mean a range between the minimum and the maximum possible mass flow that can be realized by means of the pump. With two-point closed-loop control, it is possible in particular for small mass flows to be realized in an efficient manner, and two-point closed-loop control is therefore preferably used at least for small mass flows, though may also be used for the full available mass flow range.

A further possibility for controlling the pressure in closed-loop fashion, and in so doing activating the valves only when required, is closed-loop control in the case of which a repetition frequency of activation cycles of the inlet valve and of the outlet valve is used as manipulated variable. This repetition frequency is upwardly limited by the pump frequency because, for proper operation of the pump, for each full stroke of the delivery element from a particular position until the next time said position is reached, each of the valves should, or can, be opened and closed only once. A pump frequency of 500 rpm thus allows, for example, at most eight activation cycles or a repetition frequency of 8 Hz. This repetition frequency can however be varied below this maximum value, and thus used particularly effectively as a manipulated variable. It is thus for example also the case that an activation of the valves is not necessary in every full cycle of the pump. In the example with a pump frequency of 500 rpm or a maximum repetition frequency of 8 Hz, a repetition frequency of for example 4 Hz would have the effect that the valves are only actually activated in every second full stroke.

As a form of closed-loop control, use is made here in particular of PI(D) closed-loop control, that is to say closed-loop control in the case of which a proportional component, an integral component and possibly also a differential component of a gain factor, and associated time constants, are used. It is thus possible in particular for small mass flows to be realized in an efficient manner; therefore, this form of closed-loop control is preferably used at least for small mass flows, though may also be used for the full available mass flow range.

A further possibility for controlling the pressure in closed-loop fashion is closed-loop control in the case of which the pump frequency is used as manipulated variable, wherein an activation of the inlet valve and of the outlet valve is performed. It is thus possible in particular for relatively large mass flows to be realized in an efficient manner, because particularly smooth and dynamic closed-loop control is achieved in this way. Therefore, this form of closed-loop control is preferably used at least for relatively large mass flows, though may also be used for the full available mass flow range.

These stated forms of closed-loop control may particularly advantageously be combined for different mass flow ranges. It is thus preferably possible for the two-point closed-loop control, or the closed-loop control with the repetition frequency as regulated variable, to be used for a first mass flow range, and for the closed-loop control with the pump frequency as manipulated variable to be used in a second mass flow range, wherein the second mass flow range at least partially comprises higher mass flows than the first mass flow range. It is expedient if the two mass flow ranges together cover the available mass flow range and are separated from one another by a particular threshold value. In order to avoid possible constant switching back and forth between the two forms of closed-loop control at the threshold value, use may also be made of two different threshold values, or hysteresis, in a manner dependent on the side from which the mass flow is approaching. That is to say, a switch may be made to the other form of closed-loop control at a higher threshold value in the case of an increasing mass flow than in the case of a decreasing mass flow.

The activation parameters of the valves as mentioned in the introduction may each be set to a predetermined value, which is in particular dependent on the pump frequency, in the course of the respectively used closed-loop control. Said values may in this case each be optimized with regard to the efficiency of the pump, as will be discussed in more detail below with reference to the figures.

A processing unit according to the invention, for example a control unit of a motor vehicle such as an engine control unit or an exhaust-gas aftertreatment control unit, is configured, in particular in terms of programming technology, to carry out a method according to the invention.

The invention furthermore relates to a fluid supply system, in particular an SCR system, having a pump with a pump chamber and an actively controllable inlet valve and/or an actively controllable outlet valve for the pump chamber, and to a processing unit according to the invention.

The implementation of a method according to the invention in the form of a computer program or computer program product with program code for carrying out all of the method steps is also advantageous, because this entails particularly low costs, in particular if an executing control unit is also used for other tasks and is therefore present in any case. Suitable data carriers for providing the computer program are in particular magnetic, optical and electrical memories, such as for example hard drives, flash memories, EEPROMs, DVDs and others. A download of a program via computer networks (Internet, intranet, etc.) is also possible.

Further advantages and configurations of the invention will emerge from the description and the appended drawing.

The invention is illustrated schematically in the drawing on the basis of exemplary embodiments, and will be described below with reference to the drawing.

DETAILED DESCRIPTION

Figure 1:
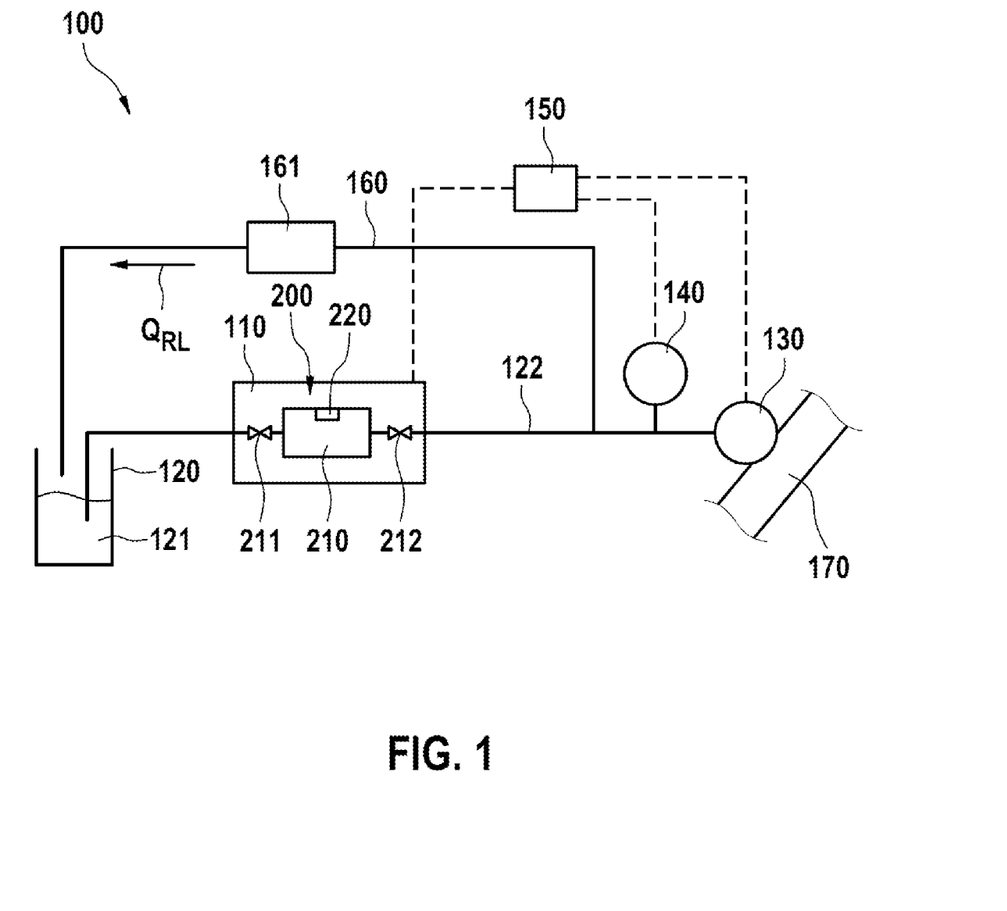
FIG. 1 schematically shows a fluid supply system according to the invention in a preferred embodiment.

FIG. 1 schematically illustrates, by way of example, a fluid supply system 100 according to the invention in a preferred embodiment. The fluid supply system 100 is configured in particular as an SCR system and comprises a delivery unit 110 which has a pump or delivery pump 200, which pump or delivery pump is configured to deliver reducing agent 121 (or a reducing agent solution) as fluid for delivery from a reducing agent tank 120 via a pressure line 122 to a dosing module or dosing valve 130 and will be described in more detail further below. At the dosing module or dosing valve, the reducing agent 121 is then sprayed into an exhaust-gas tract 170 of an internal combustion engine.

Also provided is a pressure sensor 140 (this may also be accommodated in the delivery module) which is configured to measure a pressure at least in the pressure line 122. A processing unit 150, which is configured for example as an exhaust-gas aftertreatment control unit, is connected to the pressure sensor 140 and, from this, receives information relating to the pressure in the pressure line 122. Furthermore, the exhaust-gas aftertreatment control unit 150 is connected to the delivery module 110, and in particular to the pump 111 and to the dosing module 130 therein, in order to be able to activate said delivery module.

The fluid supply system 100 furthermore comprises, by way of example, a return line 160, through which the reducing agent can be conducted from the system back (cf. $Q_{RL}$) into the reducing agent tank 120. In said return line 160, there is arranged, by way of example, an aperture or restrictor 161 which provides a local flow resistance. It is however to be noted here that such a return line may also be omitted in the case of the proposed method with actively controlled valves.

The exhaust-gas aftertreatment control unit is configured to, on the basis of relevant data, for example data received from the engine control unit or from sensors for temperature, pressure and nitrogen oxide content in the exhaust gas, coordinate the actuators of the system in order to introduce the urea-water solution into the exhaust-gas tract upstream of the SCR catalytic converter in accordance with the operating strategy. Furthermore, it is for example the case that an on-board diagnosis (OBD) arrangement monitors those components and assemblies of the exhaust-gas aftertreatment system which are relevant for adherence to exhaust-gas limit values.

The pump 200 has a pump chamber 210, which is incorporated by way of an inlet valve 211 and an outlet valve 212 into the corresponding line. Both the inlet valve 211 and the outlet valve 212 are in this case actively controllable or activatable, that is to say these two valves can be opened or closed as required. It is in particular also possible for the exhaust-gas aftertreatment unit 150 (or possibly also some other suitable processing unit; it is also conceivable for this to be integrated into a set of electronics of the pump, in particular of the motor or valve thereof) to be used for this purpose.

Furthermore, the pump 200 has a delivery element 220 with a drive in order to increase and decrease the volume of the pump chamber 210. It is to be noted at this juncture that the specific form of the delivery element 220, for example piston or the like, is not relevant for the proposed method.

Figure 2:
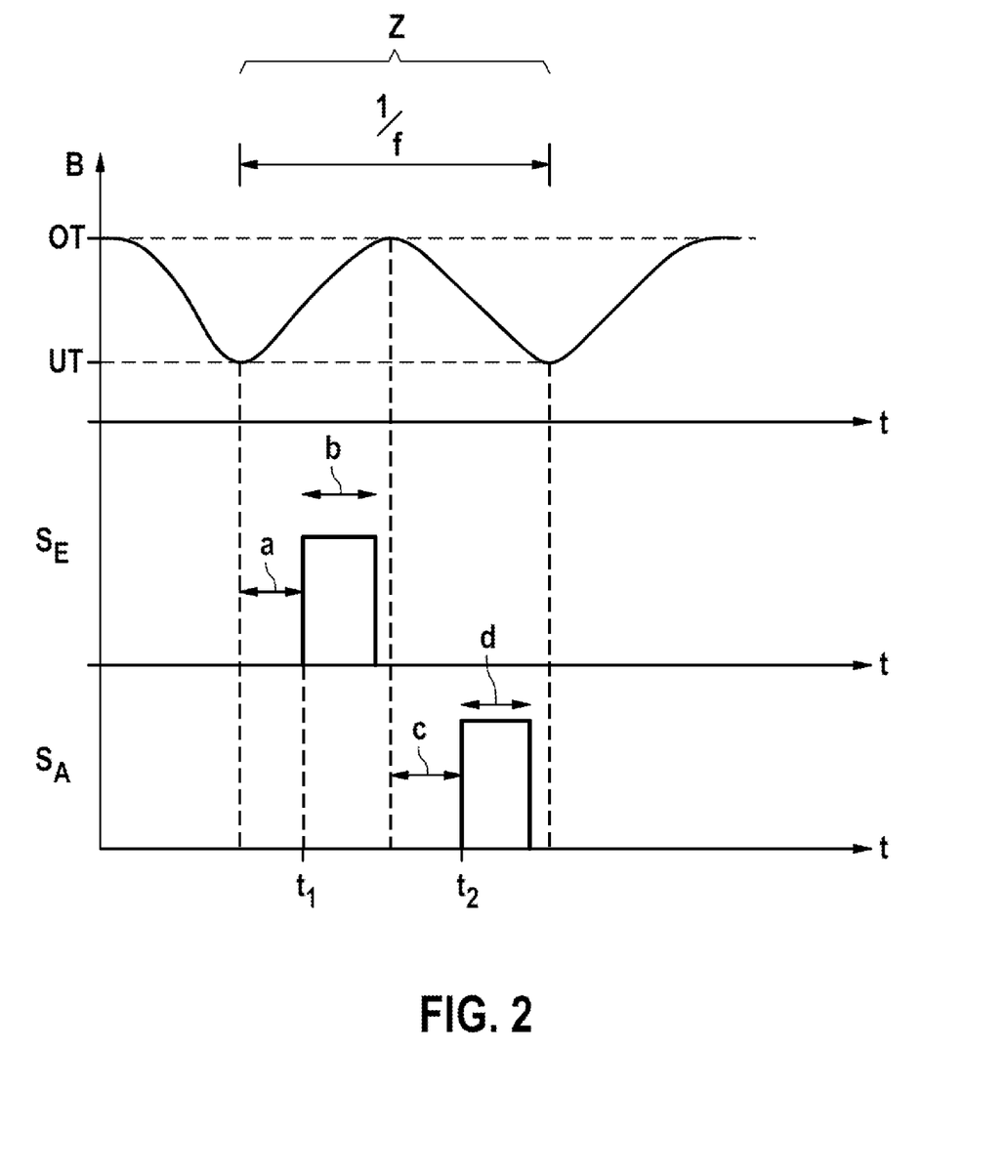
FIG. 2 schematically shows a sequence of a possible activation of active valves and a pump.

FIG. 2 schematically illustrates a sequence of a possible activation of active valves in a pump, such as is used for example in the case of the fluid supply system shown in FIG. 1. For this purpose, a course B of a position or setting of the delivery element of the pump is illustrated versus the time t, said course moving between a top dead centre OT and a bottom dead centre UT and in so doing also representing a measure for the volume (course between maximum and minimum volume).

Activation signals $S_E$ for the inlet valve and $S_A$ for the outlet valve are also illustrated versus the time t. It can be seen here that, after bottom dead centre UT, that is to say when the volume of the pump chamber is then increasing again, the inlet valve is activated such that fluid can be drawn in. Correspondingly, after top dead centre OT, that is to say when the volume of the pump chamber is then decreasing again, the outlet valve is activated such that fluid can be forced out.

Here, the valves are activated for opening at a particular time, the inlet valve at the time $t_1$ and the outlet valve at the time $t_2$. It can also be seen that the times $t_1$ and $t_2$ are spaced apart from the preceding dead centre by a time period a and c respectively. In this context, the activation time $t_1$ and $t_2$ can also be defined as a delay in relation to the corresponding dead centre.

The durations of the activation signals are denoted by b and d respectively. In this way, it is thus possible for four activation parameters a, b, c and d (or else $t_1$ and $t_2$ instead of a and c) of the valves to be used for the operation of the pump, which activation parameters can in particular each be set to particular values, as will also be discussed in more detail below.

It is pointed out at this juncture that the actual opening durations of the valves may in practice sometimes deviate, owing to necessary actuator movements, from the corresponding durations of the activation signals, but this can correspondingly be taken into consideration in the configuration of a control unit.

Also shown is a pump frequency of the pump, which, in the context of the invention, may also be used in certain embodiments as manipulated variable for the closed-loop control of the pressure. This is indicated by the period of the course B, which corresponds to the reciprocal of the pump frequency f. The period in turn corresponds to one full cycle Z of the pump, as has been discussed in the introduction.

FIGS. 3 to 6 illustrate sequences of methods according to the invention in various preferred embodiments, and explanations thereof. Firstly, in FIG. 3, a pump frequency f, which may for example correspond to a rotational speed, and a fluid mass flow or mass flow M of the fluid for delivery, are shown schematically and without specific scaling.

Figure 3:
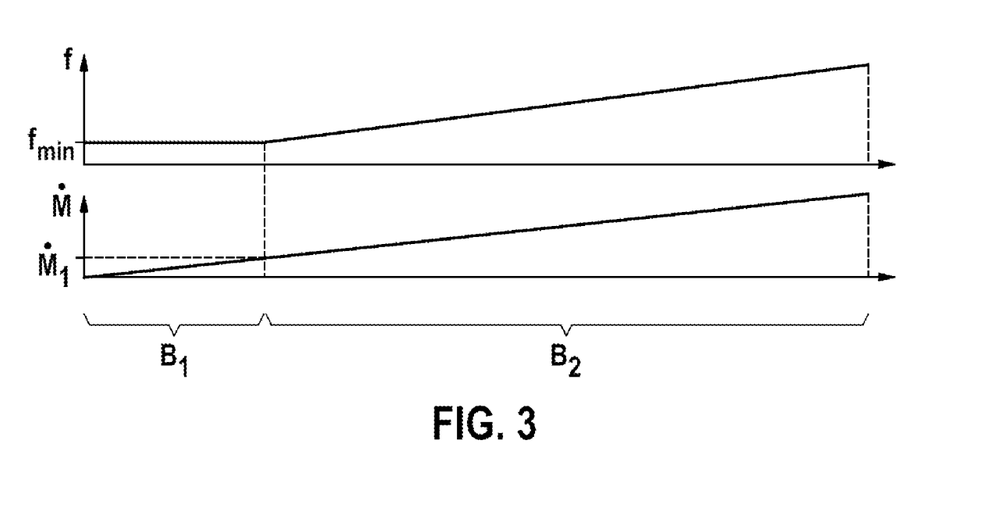
FIGS. 3 to 6 show sequences of methods according to the invention in various preferred embodiments, and explanations thereof.

In the case of the mass flow M, it can be seen that this rises continuously from zero (on the left) in linear fashion (to the right), which is intended to make it clear that, with such a pump, the mass flow can basically be varied arbitrarily from zero up to a certain maximum value, and that this is furthermore desired during normal operation.

By contrast, in the case of the pump frequency f, it can be seen that this cannot fall below a particular minimum value $f_{min}$. As already mentioned in the introduction, this is inter alia because, below this minimum value, which may for example be 500 rpm or approximately 8 Hz, the required friction force of the drive cannot be overcome. The resultant torque exerted on the drive by the pump pressure can likewise be a problem here. There thus remains a mass flow range $B_1$ in which, with constant pump frequency, that is to say for example $f_{min}$, the mass flow must be varied from zero up to a particular value $M_1$, whereas, in a mass flow range $B_2$ that covers the rest of the range, the mass flow can be varied for example by means of the pump frequency (as manipulated variable).

In a preferred embodiment of the method according to the invention, it is thus the case that, in the mass flow range $B_1$, two-point closed-loop control is used, by means of which the pressure of the fluid for delivery is controlled in closed-loop fashion.

Figure 4:
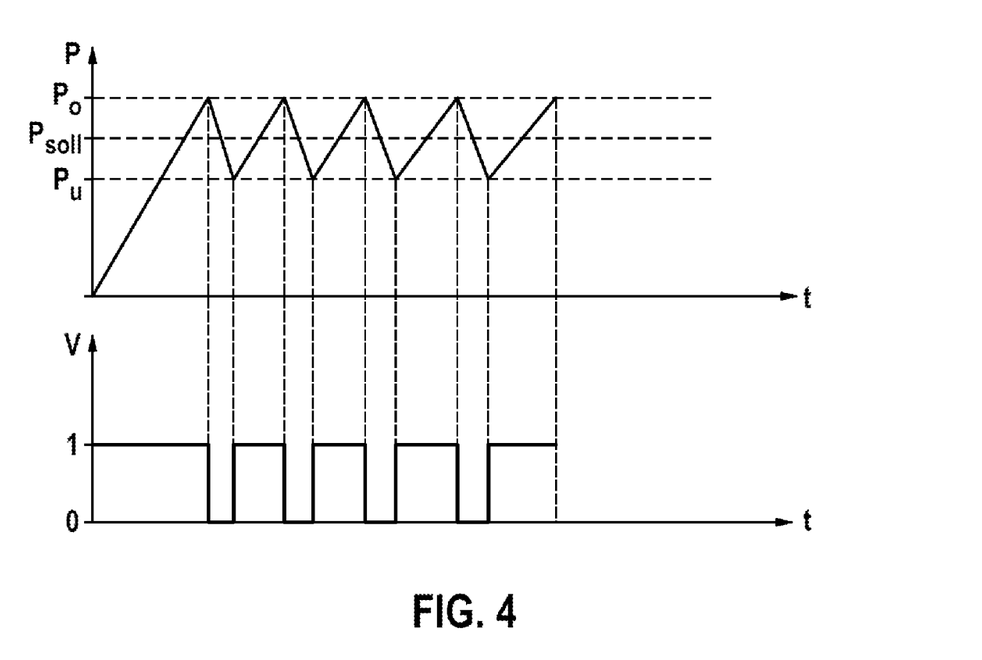

In this regard, FIG. 4 illustrates the pressure p versus the time t, wherein a setpoint value $p_{soll}$ for the pressure and an upper threshold value $p_O$ and a lower threshold value $p_U$ are shown. The value of the associated manipulated variable V for this two-point closed-loop control is also shown, likewise versus the time t, which value can assume the two values 1 for on, that is to say an activation of the valves is performed, and 0 for off, that is to say no activation of the valves is performed.

The pressure p is initially zero, that is to say the manipulated variable is set to 1, and an activation of the valves is performed. In particular, each valve is opened and closed once in every full stroke of the delivery element. Only when the upper threshold value $p_O$ is reached is the manipulated variable set to 0, that is to say the activation is stopped, and full strokes of the delivery element are thus performed without activation of the valves. Only when the pressure reaches the lower threshold value $p_U$ again is the activation of the valves started again, that is to say the manipulated variable is set to 1.

This two-point closed-loop control is, as mentioned, used in particular in the mass flow range $B_1$. If a mass flow in the mass flow range $B_2$ is desired, then a switch can be made from the two-point closed-loop control to closed-loop control with the pump frequency as manipulated variable, in particular PI(D) closed-loop control, in order to control the pressure in closed-loop fashion.

During the closed-loop control in the mass flow range $B_2$, but for example also in the case of the two-point closed-loop control in the mass flow range $B_1$, the activation parameters of the valves (for example the parameters a, b, c, d as discussed with regard to FIG. 2) are preferably set to the most optimum values possible, which are in particular dependent on the present pump frequency.

Figure 5:
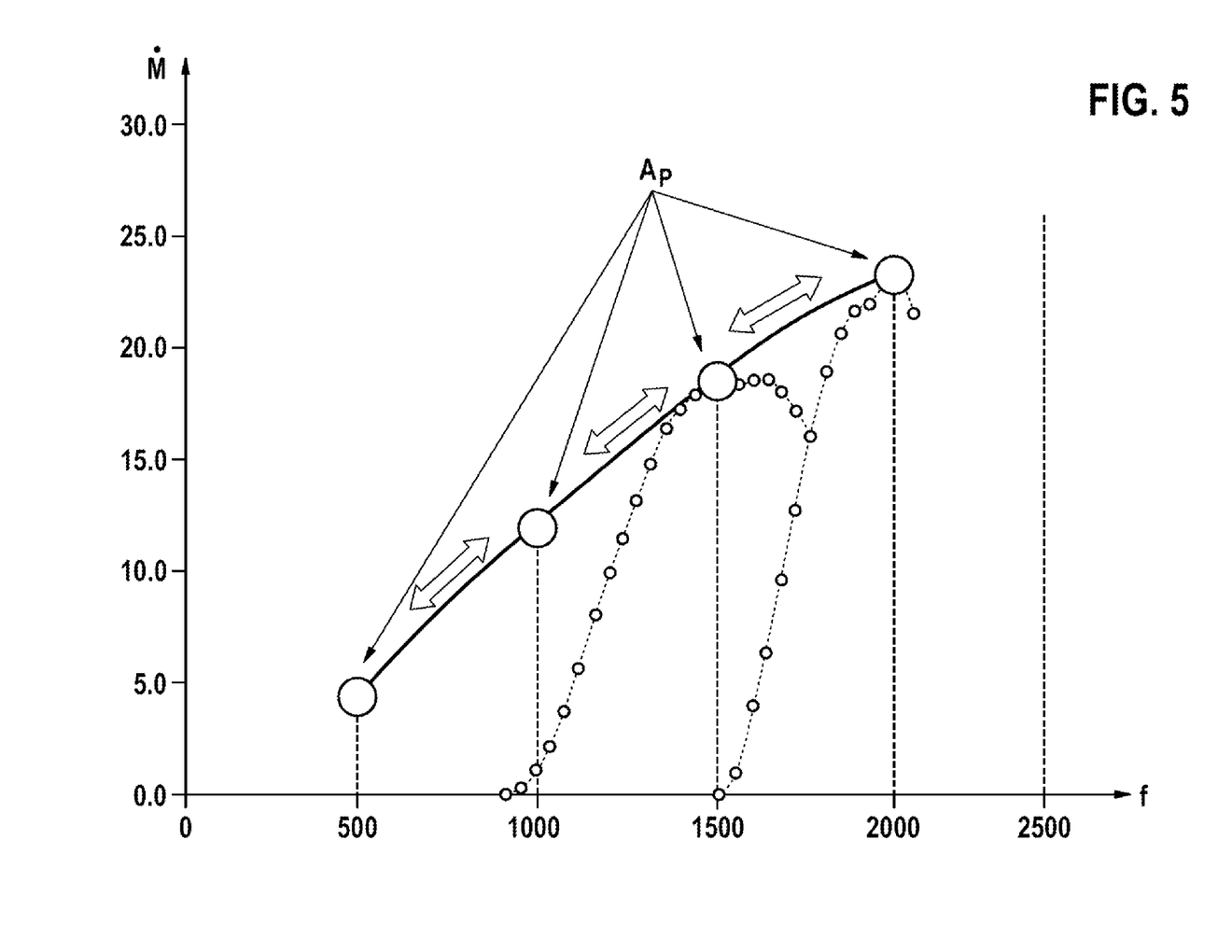

In this regard, in FIG. 5, the mass flow M is plotted versus the pump frequency f in rpm, which is for example used as manipulated variable. Here, the two curves represent—from left to right—activation parameters a, b, c, d, which are each kept constant but which differ, of the valves. It can be clearly seen here that the mass flow M can be very greatly varied even with the pump frequency f alone, but also that there is in each case a set of activation parameters in the case of which the mass flow is particularly high, that is to say particularly efficient operation is possible. In this regard, AP is used by way of example to indicate four sets of activation parameters for a respective particular pump frequency f, which activation parameters allow optimum operation at the respective pump frequency and should therefore be used as far as possible.

Figure 6:
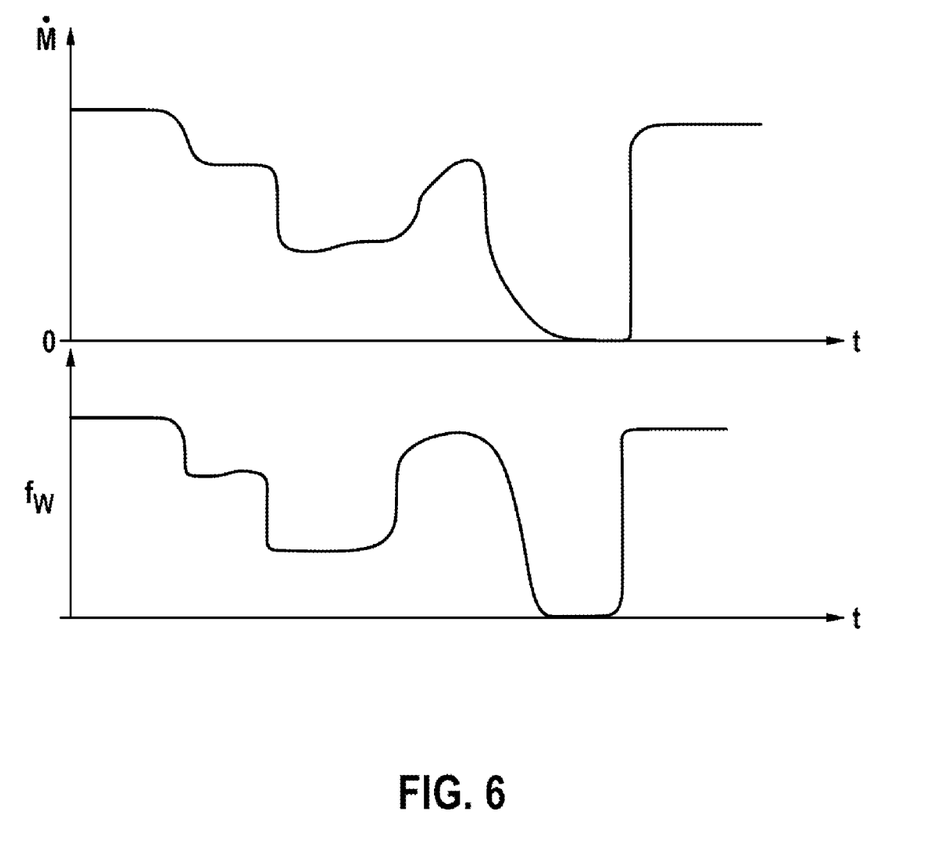

In FIG. 6, a mass flow M and a repetition frequency $f_W$ are schematically plotted in each case versus a time t. Here, the repetition frequency $f_W$ indicates how often one (full) activation cycle of the valves, with opening and closing, is performed per unit of time. From the two courses, it can be clearly seen that the mass flow M can also be varied through the variation of the repetition frequency $f_W$.

In a further preferred embodiment of the method according to the invention, it is thus the case that, in the mass flow range $B_1$, closed-loop control is used, in the case of which this repetition frequency $f_W$ is used as manipulated variable in order to perform closed-loop control of the pressure of the fluid for delivery.

This closed-loop control, which may in particular be PI(D) closed-loop control, is, as mentioned, used in particular in the mass flow range $B_1$. By contrast, the closed-loop control with the pump frequency as manipulated variable, as already mentioned above, may be used in the mass flow range $B_2$. In this embodiment, too, the above-discussed activation parameters for the valves may be used.

The invention claimed is:

1. A method for operating a pump (200) of a delivery unit (110) of a fluid supply system (100), the pump (200) having a pump chamber (210) and an actively controllable inlet valve (211) and an actively controllable outlet valve (212) for the pump chamber (210), the method comprising:
controlling a pressure (p) of a fluid (121), which is to be provided by the pump (200), in a closed-loop fashion on the basis of a manipulated variable (V, f, fw), and within one full cycle (Z) of the pump (200), activating at least one of the inlet valve (211) and the outlet valve (212) only if fluid is to be delivered, and not activating at least one of the inlet valve (211) and the outlet valve (212) if no fluid is to be delivered,
wherein the pressure (p) of the fluid (121), at least in a part of an available mass flow range of the fluid, is controlled in a closed-loop fashion by means of a first closed-loop control used for a first mass flow range ($B_1$) using a repetition frequency (fw) of activation cycles of the inlet valve (211) and of the outlet valve (212) as the manipulated variable and the pressure (p) is controlled in a closed-loop fashion by means of a second closed-loop control used in a second mass flow range ($B_2$) using a pump frequency (f) as another manipulated variable, wherein the second mass flow range ($B_2$) includes higher mass flows than the first mass flow range ($B_1$).

2. The method according to claim 1, wherein, if no fluid is to be delivered, a zero delivery state is implemented by the pump.

3. The method according to claim 1, wherein, if no fluid is to be delivered, a drive of the pump (200) is not actuated.

4. The method according to claim 1, wherein, if no fluid is to be delivered, the inlet valve (211) remains permanently open.

5. A method for operating a pump (200) of a delivery unit (110) of a fluid supply system (100), the pump (200) having a pump chamber (210) and an actively controllable inlet valve (211) and an actively controllable outlet valve (212) for the pump chamber (210), the method comprising:
controlling a pressure (p) of a fluid (121), which is to be provided by the pump (200), in a closed-loop fashion on the basis of a manipulated variable (V, f, fw), and within one full cycle (Z) of the pump (200), activating at least one of the inlet valve (211) and the outlet valve (212) only if fluid is to be delivered, and not activating at least one of the inlet valve (211) and the outlet valve (212) if no fluid is to be delivered,
wherein the pressure (p) of the fluid (121), at least in a part of an available mass flow range of the fluid, is controlled in a closed-loop fashion by means of a first closed-loop control used for a first mass flow range ($B_1$) that is a two-point closed-loop control in which a use (V) of an activation of the inlet valve (211) and of the outlet valve (212) is used as the manipulated variable, and wherein a pump frequency (f) is set to a predetermined value ($f_{min}$) greater than zero, and the pressure (p) is controlled in a closed-loop fashion by means of a second closed-loop control used in a second mass flow range ($B_2$) using the pump frequency (f) as another manipulated variable, wherein the second mass flow range ($B_2$) includes higher mass flows than the first mass flow range ($B_1$).

6. A method for operating a pump (200) of a delivery unit (110) of a fluid supply system (100), the pump (200) having a pump chamber (210) and an actively controllable inlet valve (211) and an actively controllable outlet valve (212) for the pump chamber (210), the method comprising:
controlling a pressure (p) of a fluid (121), which is to be provided by the pump (200), in a closed-loop fashion on the basis of a manipulated variable (V, f, fw), and within one full cycle (Z) of the pump (200), activating at least one of the inlet valve (211) and the outlet valve (212) only if fluid is to be delivered, and not activating at least one of the inlet valve (211) and the outlet valve (212) if no fluid is to be delivered,
wherein the pressure (p) of the fluid (121), at least in a part of an available mass flow range of the fluid, is controlled in a closed-loop fashion by means of a first closed-loop control used for a first mass flow range ($B_1$) that is a two-point closed-loop control in which a use (V) of an activation of the inlet valve (211) and of the outlet valve (212) is used as the manipulated variable, and wherein a pump frequency (f) is set to a predetermined value ($f_{min}$) greater than zero, and the pressure (p) is controlled in a closed-loop fashion by means of a second closed-loop control used in a second mass flow range ($B_2$) using another manipulated variable, wherein the second mass flow range ($B_2$) includes higher mass flows than the first mass flow range ($B_1$),
wherein an activation time ($t_1$) of the inlet valve, an activation angle of the inlet valve, an opening time of the inlet valve, an opening angle of the inlet valve, an activation duration (b) of the inlet valve, an activation angle range of the inlet valve, an opening duration of the inlet valve, and an opening angle range of the inlet valve are used as activation parameters of the inlet valve (211) and an activation time ($t_2$) of the outlet valve, an activation angle of the outlet valve, an opening time of the outlet valve, an opening angle of the outlet valve, an activation duration (d) of the outlet valve, an activation angle range of the outlet valve, an opening duration of the outlet valve and an opening angle range of the outlet valve are used as activation parameters ($A_P$) of the outlet valve (212), each of the activation parameters of the inlet valve and the activation parameters of the outlet valve being set to a predetermined value dependent on the pump frequency (f).

* * * * *